H. C. GRIFFIN.
CHANGE SPEED GEAR.
APPLICATION FILED NOV. 26, 1909.

958,632.

Patented May 17, 1910.
2 SHEETS—SHEET 2.

Witnesses—
Stanley Wood
Henry William Blake

Inventor
Hubert Charles Griffin
by
W. E. Evans.
Attorney.

UNITED STATES PATENT OFFICE.

HUBERT CHARLES GRIFFIN, OF BRISTOL, ENGLAND, ASSIGNOR OF ONE-THIRD TO CHARLES STANCOMB WARE, OF BRISTOL, ENGLAND.

CHANGE-SPEED GEAR.

958,632.  Specification of Letters Patent.  Patented May 17, 1910.

Application filed November 26, 1909. Serial No. 530,068.

*To all whom it may concern:*

Be it known that I, HUBERT CHARLES GRIFFIN, a subject of the King of Great Britain and Ireland, residing at Elm Mills, Patchway, Bristol, England, have invented certain new and useful Improvements Relating to Change-Speed Gear, of which the following is a specification.

This invention relates to variable speed gear of the type in which a centrally disposed and longitudinally movable double cone member is provided and is adapted upon movement in one direction or the other to contact with inclined surfaces provided upon locking members which, when operated, serve to lock one or other of the driving pinions of the gear to the shaft, according to the speed which it is desired to transmit to the driven shaft.

The invention is more especially applicable to the subject-matter of the prior British Patent No. 12425/07 granted to me and with reference thereto has for its object to provide simple and effective means to change the gear when running.

The accompanying drawings show constructional forms of the speed gear provided according to the invention.

Figure 1:
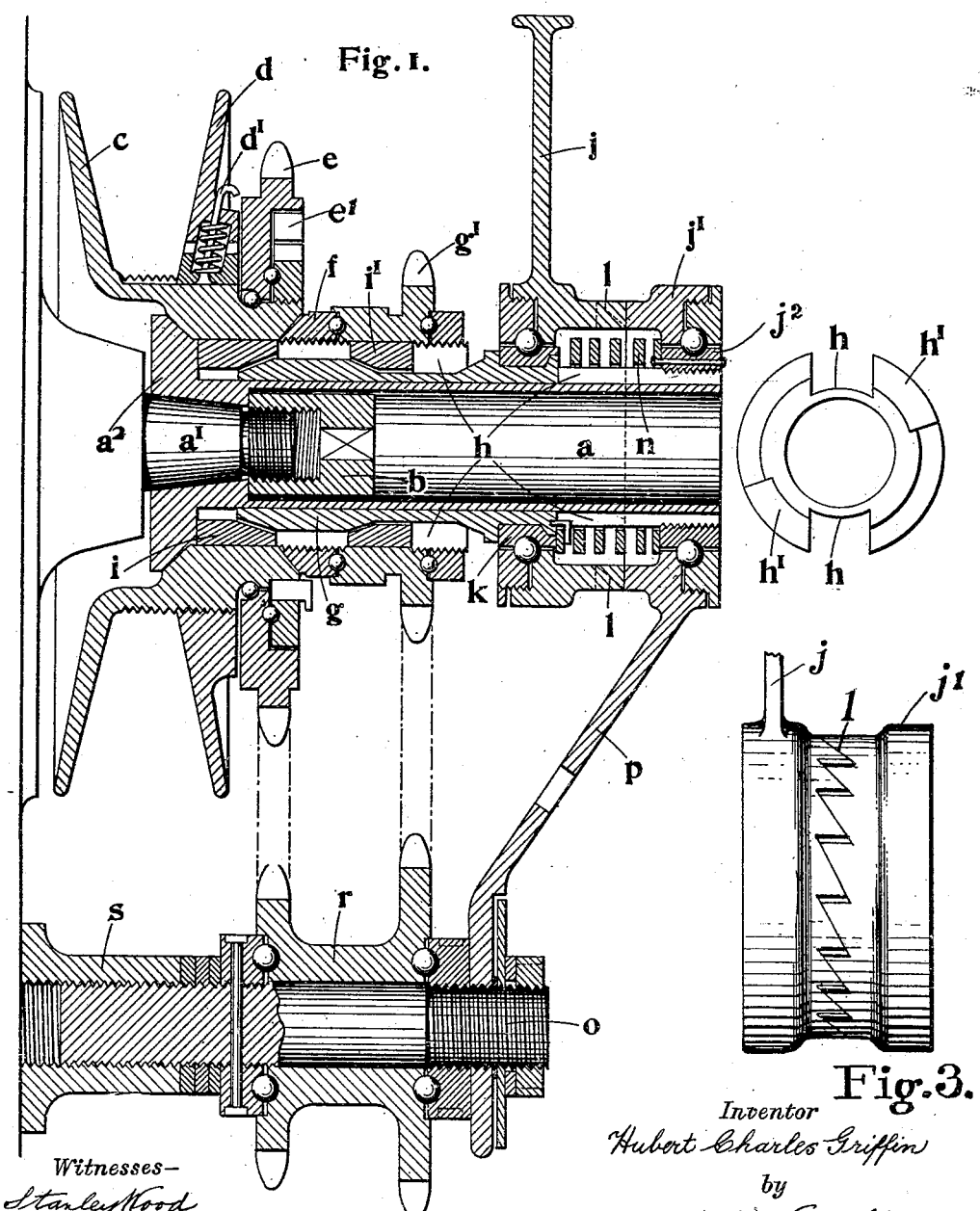
Figure 2:
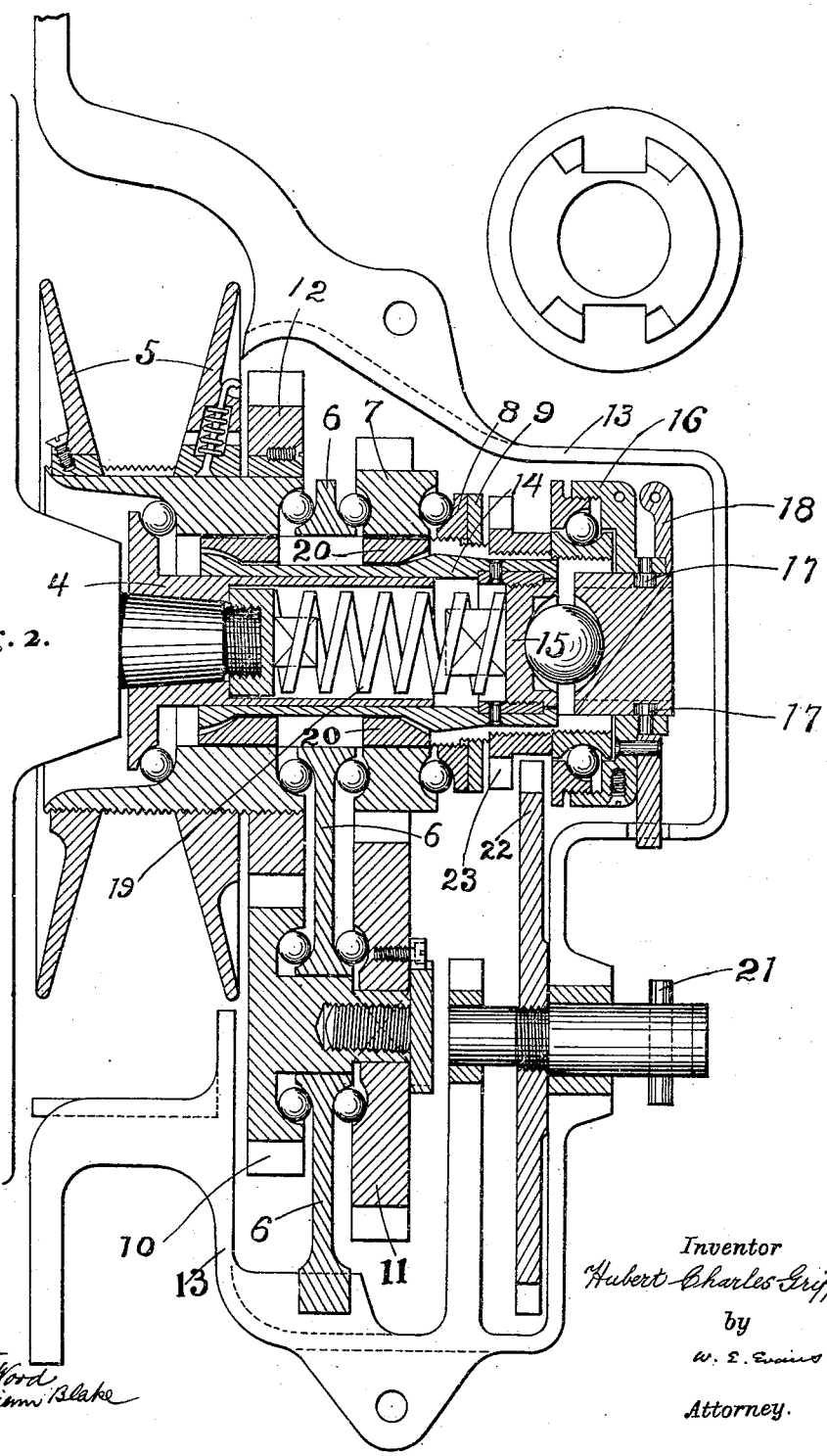

Figure 1 is a cross section of one constructional form. Fig. 2 is a cross section of a modified form. Fig. 3 is an exterior detail view of the lever $f$ and the cam mechanism $l$.

In carrying the invention into effect, in its adaption to a motor cycle, I mount the clutch before described upon the engine shaft and I advantageously provide a hollow extension shaft $a$ which is internally coned at $a^1$ to fit the conical protruding extremity of the engine shaft and is secured upon it by the internal nut $b$. Upon the extension near the engine casing a belt pulley $c$ is provided with an adjustable flange $d$ which is screw-threaded upon the boss of the pulley and is fixedly held in any particular position of adjustment by a spring bolt or key $d^1$ which engages in an axial slot in the boss of the pulley and thus prevents its further rotation. By such means effective provision is made for the alteration of the effective periphery or channel of the pulley.

The bolt or key referred to may be normally under the action of a spiral spring which maintains it in position in the slot or incision in the pulley boss. By rotating the movable flange or face of the pulley to the extent desired any particular adjustment may be made and the bolt or key caused to engage in its slot.

The boss of the pulley $c$ is provided with conical bearing faces by which it is supported on corresponding conical faces upon the flange $a^2$ of the hollow shaft and upon the ring $f$ screwed in position on the shaft respectively and a large free wheel sprocket $e$ is mounted on the boss of the pulley being connected thereto by a free wheel device $e^1$. This free wheel device may be any proper form of pawl-and-ratchet device whereby the sprocket wheel $e$ is allowed to rotate freely in one direction on its bearing; but is held against rotation thereon in the opposite direction. A smaller sprocket wheel $g^1$ is mounted on the hollow shaft $a$ adjacent the ring $f$ between two ball races respectively provided between each of the faces of the sprocket wheel itself and the ring $f$ on the one side and another ring or boss screwed into position on the shaft on the other side of the sprocket wheel.

The hollow shaft is milled out nearly the whole length in diametrically opposite position to form longitudinal recesses $h$ for the reception of sliding friction pieces $g$, and recesses are also formed at $h^1$ for the reception of friction blocks $i$ and $i^1$ respectively. These latter are formed with inclined faces whose inclination is slightly more than the inclination of the enlarged part of the sliding pieces $g$ which are disposed between them. The extremities of the sliding pieces are connected to a ring $k$ upon which is mounted the boss of an operating lever $j$ having provided at its rearward edge cam teeth in the position indicated at $l$ so that the partial rotation of the lever $j$ permits the rearward movement of the ring $k$ and with it the sliding pieces $g$ under the influence of the spring $n$ which is secured at its ends to the sliding pieces $g$ and a ring $j^2$ secured upon the hollow shaft and thus the enlarged part of the sliding pieces $g$ make contact with the blocks $i^1$ and bind the smaller sprocket wheel $g^1$ upon the hollow shaft $a$, and thus low speed is transmitted. On the movement of the operating lever $j$ in the opposite direction it will be understood that under the action of the spring $n$ the enlarged part of the sliding pieces $g$ will move forwardly and engage with the inclined faces of the friction blocks $i$ by which the boss of the pulley $c$ will then be bound upon the shaft and thus the high speed transmitted. In the mid position of the operating lever $j$ the enlarged part of the sliding pieces $g$ will be disposed midway between the friction blocks $i$ and $i^1$ as shown in the drawing, in which position the engine runs free.

The outer extremity of the hollow shaft $a$ is supported in ball bearings by means of a ring $j^1$ within the edge of which recesses are formed corresponding in shape to the cam teeth of the operating member $j$ before referred to and the ring $j^1$ is integrally formed or connected with the strut $p$ by which it is supported upon the extremity of the counter-shaft $o$ upon which is carried the twin sprocket $r$, the respective sprockets being provided in line respectively with the sprocket wheels on the engine shaft. The counter-shaft $o$ is carried parallel with the engine shaft in a fitting $s$ mounted upon the crank casing of the engine. The strut $p$ also serves to hold the boss against which the operating lever of the clutch acts.

It will be understood that the twin sprocket $r$ may be reversed on the shaft to give a different ratio of gear.

In the modification illustrated in Fig. 2 the pulley 5, coupling link 6 and the pinion wheel 7 are mounted between ball races on the shaft 4, and can be adjusted by the cone ring 8 and locking ring 9, left and right hand threads respectively. The twin pinion wheels 10 and 11 are mounted on ball races on the coupling link 6 and gear with and are always in mesh with the pinion wheels 12 and 7 respectively. The coupling link 6 is prevented from revolving by an abutment on the gear casing 13. The extremities of the sliding members 14 are riveted to a ring into which is screwed a ball thrust disk 15. The ring 16 mounted on a ball race on the end of the hollow shaft 4 is formed with a sleeve in which are riveted pins indicated at 17, which engage in a coarse cut thread on the boss of the operating lever 18. It will be seen that by a partial rotation of the lever 18 against the action of the spring 19 the sliding members 14 will expand the friction blocks 20 against the pinion wheel 7 and bind it to the shaft when the low speed is to be transmitted through the set of pinion wheels, the pulley revolving in the same direction as the shaft 4 but at a reduced speed. Under the action of the spring 19 the friction blocks 20 will be expanded against the boss of the pulley and bind it to the shaft when the high speed is transmitted. The lever 18 is moved in one direction by a "Bowden" wire, and in the other through the action of the spring 19; in the mid position the engine runs free, the lever 18 being kept in the desired position by a self locking lever on the handle bar of the machine.

With a handle placed on the short shaft at 21 the pinion wheel 22 is brought into mesh with the smaller pinion wheel 23, so that the engine may be started suitably geared up.

For chain-driven machines the driving sprocket wheel is mounted in place of the pulley flanges, and in such a manner by the aid of a spring to give a flexible drive and to absorb road shocks.

The gear casing 13 is bolted to the crank casing of the engine.

What I claim as my invention and desire to secure by Letters Patent is.—

1. Change speed gear comprising a driving shaft, an expanding belt pulley upon said driving shaft, means for adjusting the effective diameter of the pulley, a change speed wheel upon the boss of the expanding pulley and connected to said pulley, a change speed wheel upon the driving shaft and means for alternately coupling the pulley boss or the second change speed wheel to the driving shaft, a countershaft, and a double change speed wheel on the countershaft said double change speed wheel being adapted to be driven by the change speed wheels aforesaid, substantially as described.

2. Variable speed gear comprising a driving shaft, an expanding pulley upon said driving shaft, means for adjusting the expanding pulley, a free change speed wheel upon the boss of said pulley, a change speed wheel upon the driving shaft and means for alternately coupling the expanding pulley and the second change speed wheel to the driving shaft, a double change speed wheel, and means for connecting the double change speed wheel to the change speed wheel aforesaid substantially as described.

3. Change speed gear comprising a driving shaft, having a conical extension, a hollow shaft having lateral and longitudinal recesses, an expanding belt pulley upon said hollow shaft, means for adjusting the effective diameter of said pulley, a change speed wheel upon the boss of the pulley and connected to said pulley, a change speed wheel upon the hollow shaft, wedges in the lateral recesses of the hollow shaft, a sliding wedge shaped member alternately engaging with the wedges, means for imparting a sliding movement to the sliding member, a double change speed wheel, said double wheel being adapted to be driven by the change speed wheels aforesaid substantially as described.

4. Change speed gear comprising a driving shaft having a conical extension, a hollow shaft having lateral and longitudinal recesses, an expanding pulley upon said hollow shaft, means for adjusting the effective diameter of the expanding pulley, a change speed free wheel upon the boss of said pulley, a change speed wheel upon the hollow shaft, wedges in the lateral recesses of the hollow shaft, a sliding wedge shaped member alternately engaging with the wedges, means for imparting a sliding movement to the sliding member, a double change speed wheel said double wheel being adapted to be driven by the change speed wheels aforesaid substantially as described.

5. Change speed gear comprising a driving shaft, a driving wheel and change speed free wheel having a common boss disposed co-axially with the driving shaft, a second change speed wheel mounted loosely upon the driving shaft and means for alternatively clutching the boss or the second change speed wheel to the driving shaft, and means for operating the clutch members disposed co-axially with the driving shaft adjacent to the second change speed wheel, and a double change speed wheel operatively engaged with the change speed wheels aforesaid substantially as described.

6. Change speed gear, comprising a driving shaft, a driving wheel, and a change speed free wheel having a common boss disposed co-axially with the driving shaft, a second change speed wheel mounted loosely upon the driving shaft, there being lateral and longitudinal recesses in the driving shaft, wedge clutch members for the boss and second change speed wheel in the lateral recesses, sliding wedge members in the longitudinal recesses for engagement with the clutch members, means adjacent to the second change speed wheel for imparting sliding movement to the sliding members and a double change speed wheel operatively engaged with the change speed wheels aforesaid substantially as described.

7. Change speed gear comprising a driving shaft, a driving wheel and a change speed wheel having a common boss disposed co-axially with the driving shaft, a second change speed wheel mounted loosely upon the driving shaft, means for alternatively clutching the boss of the second change speed wheel to the driving shaft, means for operating the clutch members comprising interengaging members with inclined faces and a spring, and a double change speed wheel operatively engaged with the change speed wheels aforesaid substantially as described.

8. Change speed gear comprising a driving shaft having a conical extension, a hollow shaft mounted on the said extension, an internal nut for securing the hollow shaft to the extension, a driving wheel and change speed free wheel having a common boss disposed co-axially with the hollow shaft, a second change speed wheel mounted loosely upon the hollow shaft and means for alternatively clutching the boss or the second change speed wheel to the hollow shaft, and means for operating the clutch members disposed co-axially with the hollow shaft adjacent to the second change speed wheel and a double change speed wheel operatively engaged with the change speed wheels aforesaid substantially as described.

In testimony whereof I have hereunto signed my name to this specification in the presence of two subscribing witnesses.

HUBERT CHARLES GRIFFIN.

Witnesses:
GEORGE EDWARD MOREMAN,
WILLIAM RICHMOND ROY PALMER.